(12) United States Patent
Ohno

(10) Patent No.: US 7,578,364 B2
(45) Date of Patent: Aug. 25, 2009

(54) ENGINE START CONTROL DEVICE AND METHOD FOR A HYBRID VEHICLE

(75) Inventor: Takeshi Ohno, Hodogaya-ku (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 177 days.

(21) Appl. No.: 10/572,986

(22) PCT Filed: Nov. 1, 2005

(86) PCT No.: PCT/IB2005/003269

§ 371 (c)(1),
(2), (4) Date: Mar. 23, 2006

(87) PCT Pub. No.: WO2006/048735

PCT Pub. Date: May 11, 2006

(65) Prior Publication Data

US 2007/0284161 A1 Dec. 13, 2007

(30) Foreign Application Priority Data

Nov. 2, 2004 (JP) .............................. 2004-319165

(51) Int. Cl.
*B60W 10/06* (2006.01)
(52) U.S. Cl. .............................. 180/65.28; 180/65.265; 903/941; 701/22
(58) Field of Classification Search ................ 180/65.2, 180/65.3, 65.4, 65.265, 65.275, 65.28, 65.285; 701/22; 903/940, 941, 942
See application file for complete search history.

(56) References Cited

U.S. PATENT DOCUMENTS

| 6,019,183 A | * | 2/2000 | Shimasaki et al. .......... 180/165 |
| 6,290,012 B1 | * | 9/2001 | Matsubara et al. ......... 180/65.4 |
| 6,593,713 B2 | * | 7/2003 | Morimoto et al. ........... 318/139 |
| 6,715,572 B2 | * | 4/2004 | Shimabukuro et al. ..... 180/65.6 |
| 6,755,266 B2 | * | 6/2004 | Lasson ...................... 180/65.4 |
| 6,775,601 B2 | * | 8/2004 | MacBain ..................... 701/22 |
| 7,281,509 B2 | * | 10/2007 | Fukui et al. ............ 123/179.16 |
| 2002/0063002 A1 | | 5/2002 | Lasson |
| 2002/0179351 A1 | | 12/2002 | Shimabukuro et al. |

FOREIGN PATENT DOCUMENTS

| JP | 2000-097068 | 4/2000 |
| JP | 2000-120455 | 4/2000 |
| JP | 2001-132507 | 5/2001 |
| JP | 2001-280185 | 10/2001 |

OTHER PUBLICATIONS

Notification of Transmittal of the International Search Report and the Written Opinion of the International Searching Authority dated Feb. 24, 2006, for corresponding International Application No. PCT/IB2005/003269 (12 pages).

* cited by examiner

*Primary Examiner*—Christopher P Ellis
*Assistant Examiner*—John D Walters
(74) *Attorney, Agent, or Firm*—Young Basile

(57) ABSTRACT

An engine start control device for a hybrid vehicle equipped with an electric motor and an engine with an induction system, including a hybrid controller that performs an engine start determination to determine whether the engine should be started while the electric motor is running; an acceleration position sensor that detects an acceleration demand during the engine start determination; and a start/power generation motor that starts the engine, wherein the start/power generation motor controls the pressure in the induction system based on acceleration demand.

19 Claims, 10 Drawing Sheets

ENGINE START CONTROL DEVICE AND METHOD FOR A HYBRID VEHICLE

This application is a National Stage filing under 35 USC 371 of International Application No. PCT/IB2005/003269, filed Nov. 1, 2005, which claims priority to Japanese Patent Application No. 2004-319165, filed Nov. 2, 2004, the entire contents of each of which is incorporated herein by reference.

TECHNICAL FIELD

The present invention relates to an engine start control device for a hybrid vehicle which is equipped with a motor and an engine.

BACKGROUND

A hybrid vehicle having both a motor and an engine is powered only by a motor when the vehicle is under a small load. When the load increases, the hybrid vehicle starts the engine to provide additional driving force. When the hybrid vehicle shifts from running only with a motor to using the engine as well, it is necessary to rapidly start the engine. If it takes a long time to start the engine, the driving force cannot be smoothly controlled, which deteriorates vehicle performance.

Therefore, the time required to start the engine may be reduced by controlling the action timing of the induction system at the time the engine starts. However, when the engine start time is shortened as described above, the engine torque is applied immediately after the complete combustion of the engine start, which results in an engine start shock. The driver tends to feel the engine start shock, particularly when the vehicle is accelerated slowly.

SUMMARY

In general, the present disclosure is directed to an engine start control device for a hybrid vehicle which may prevent the shock that the driver feels during slow acceleration and also provides good throttle response when rapid acceleration is required.

In one aspect, the present disclosure is directed to an engine start control device for a hybrid vehicle equipped with an electric motor and an engine with an induction system, including a hybrid controller that performs an engine start determination to determine whether the engine should be started while the electric motor is running, an acceleration position sensor that detects an acceleration demand during the engine start determination, and a start/power generation motor that starts the engine, wherein the start/power generation motor controls the pressure in the induction system based on acceleration demand.

In another aspect, the present disclosure is directed to a method including determining whether an engine should be started while a motor is running, wherein the engine includes an induction system, detecting an acceleration demand of a driver during an engine start determination, and starting the engine after controlling the pressure in the induction system based on the acceleration demand.

In yet another aspect, the present disclosure is directed to an engine start control device for a hybrid vehicle equipped with an electric motor and an engine, including means for performing an engine start determination while the electric motor is running, means for detecting acceleration demand of the driver during said engine start determination, and means for controlling the induction pressure of the induction system to start the engine based on said acceleration demand.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
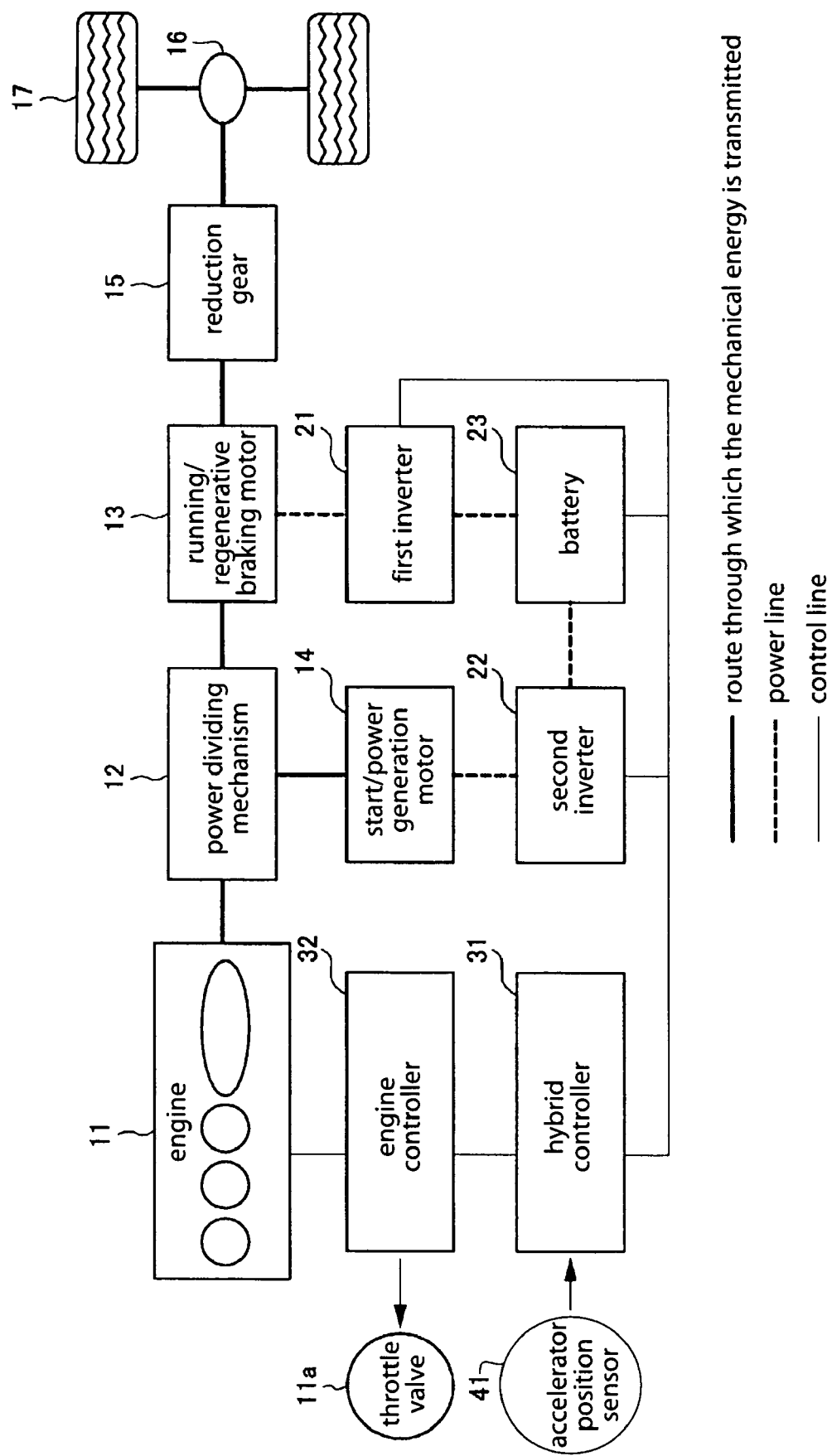
FIG. 1 is a schematic block diagram illustrating the structure of an embodiment of the engine start control device for a hybrid vehicle.

The embodiments of the present invention will be described in detail below by referring to the drawings, but the present invention is not limited to this embodiment.

FIG. 1 is a block diagram illustrating an embodiment of the engine start control device for a hybrid vehicle. In FIG. 1, the thick solid line indicates the route through which mechanical energy is transmitted, the dashed line indicates the electric power line, and the thin solid line indicates the control line.

Referring to FIG. 1, a hybrid vehicle includes an engine 11, a planetary gear mechanism 12, a running/regenerative braking motor 13, a start/power generation motor 14, a reduction gear 15, a differential arrangement 16, drive wheels 17, a first inverter 21, a second inverter 22, a battery 23, a hybrid controller 31 and an engine controller 32.

The running/regenerative braking motor 13 is connected to engine 11 through the planetary gear mechanism 12, which functions as a power divider. The running/regenerative braking motor 13 is used for driving (power running) and braking (regenerative braking) of the vehicle. The running/regenerative braking motor 13 is an alternator such as, for example, a three-phase synchronized motor and three-phase induction motor.

Figure 1A:
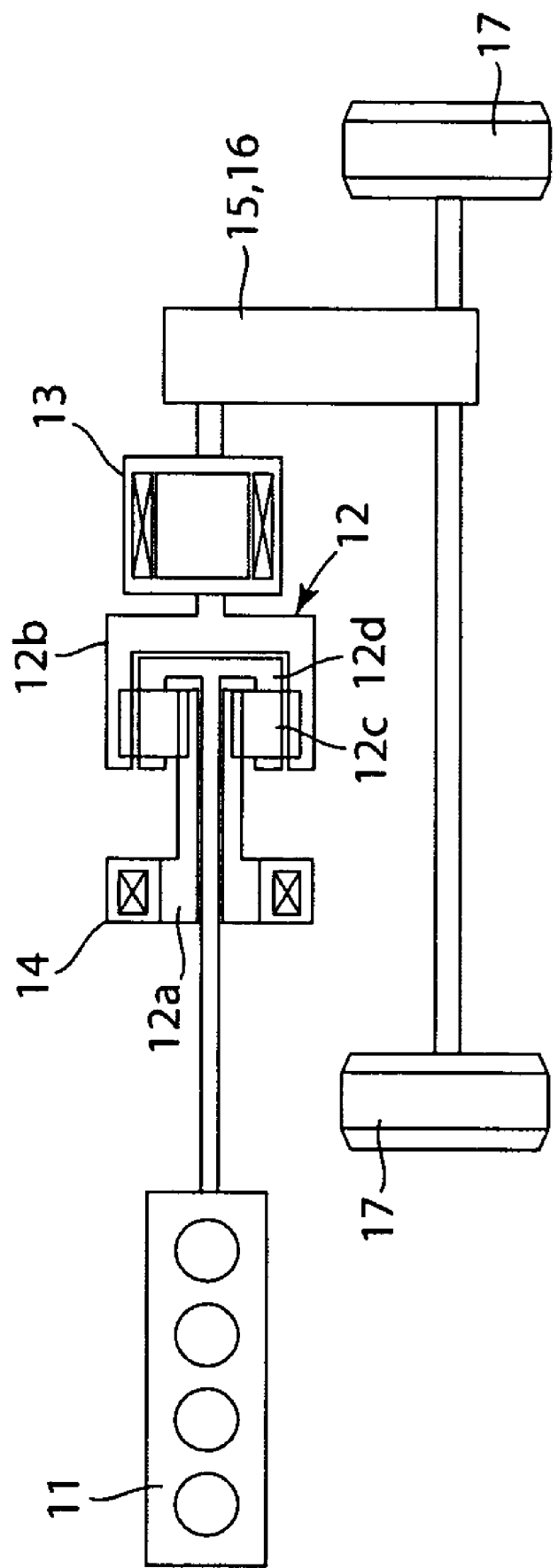
FIG. 1A is a schematic diagram illustrating the driveline of a hybrid vehicle.

Referring to FIG. 1A, the planetary gear mechanism 12 includes a sun gear 12$a$, which is a first rotating element connected to start/power generation motor 14, ring gear 12$b$, which is a third rotating element connected to driving wheels 17, and a plurality of pinion gears 12$c$, which are engaged in the outer circumference of sun gear 12$a$ and the inner circumference of ring gear 12$b$ and are concentrically placed. Planetary gear mechanism 12 rotatably supports the plurality of pinion gears 12c and has carrier 16d, which is a second rotating element connected to engine 11.

The running/regenerative braking motor 13 is placed in the driving force transmitting path formed by ring gear 12b, reduction gear 15 and differential arrangement 16. According to the present embodiment, running/regenerative braking motor 13 is serially connected to the input axes of reduction gear 15 and differential arrangement 16. That is, ring gear 12b, which is the gear element connected to running/regenerative braking motor 13, is connected to the driving force transmitting path connected to driving wheels 17. When running/regenerative braking motor 13 and start/power generation motor 14 are driven to increase rotation, that is, when a positive torque is output during the positive rotation, or when a negative torque is outputted during the negative rotation, they function as motors and consume electric power from the battery through an inverter. Also, when running/regenerative braking motor 13 and start/power generation motor 14 are driven to decrease rotation, that is, when a negative torque is output during the positive rotation, or when a positive torque is outputted during the negative rotation, they function as power generating machines and charge the battery through an inverter.

The driving force needed to run the vehicle is mainly outputted by engine 11 and motor 13. Typically, in the idling area, which does not have good engine efficiency, in the low-speed area and in the moderate to high speed and low loaded area, the vehicle is driven by motor 13 where only motor 13 is the source for driving the vehicle. When the demanded driving force of the vehicle cannot be obtained only by the output of engine 11, electric power is supplied from battery 24 to drive motor 13 and the generated motor torque is added (assisted) to the engine torque. Motor 13 collects the speed reduction energy by conducting the regenerative driving when the speed of the vehicle is reduced and can charge the battery through an inverter or can be driven as a power generating machine when the vehicle is running by the engine 11.

Next, the operation of planetary gear mechanism 12 will be described. When the number of the teeth of ring gear 12b is Zr, that of sun gear 12a is Zs, the gear ratio of ring gear 12b and sun gear 12a is λ, λ=Zs/Zr. When the number of rotations of ring gear 12b is Nr, that of sun gear 12a is Ns and that of carrier 16d is Nc, the relationship of these numbers and gear ratio λ is formula (I) below:

$$Nr+\lambda Ns=(1+\lambda)Nc \quad (1)$$

Figure 1B:
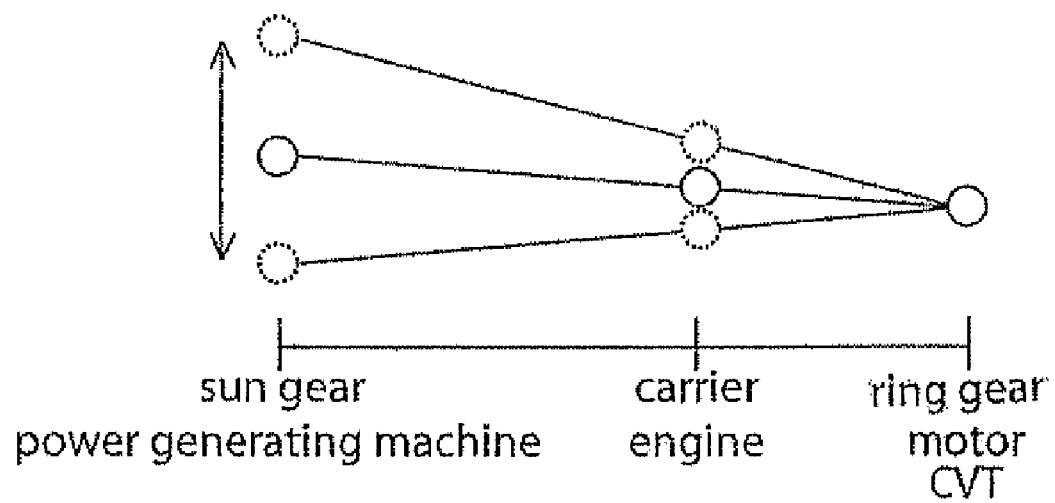
FIG. 1B is a plot showing the relationship between the components of a planetary gear mechanism.
Figure 1C:
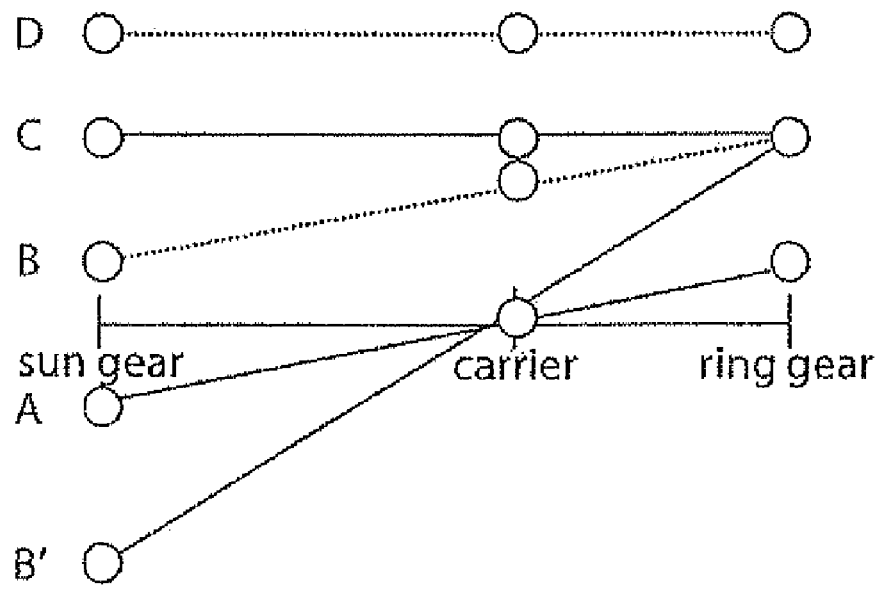
FIG. 1C is a plot showing the relationship between the components of a planetary gear mechanism.

FIGS. 1B and 1C are collinear diagrams indicating the relationship among the numbers of rotations of each element of planetary gear mechanism 12. According to the collinear diagrams, sun gear 12a and ring gear 12b, which are the elements of both sides, are connected to start/power generation motor 14 and running/regenerative braking motor 13 respectively and carrier 12d, which is the element of the inside, is connected to engine 11. Number of rotations Nr of the ring gear, which corresponds to the number of rotations of the input of differential arrangement 16, changes in accordance with the shift transmission ratio of the speed of the vehicle, reduction gear 15 and differential arrangement 16. In a situation wherein the shift transmission ratio of reduction gear 15 and differential arrangement 16 is maintained at a minimum such as in the case where the vehicle is running at a high speed, the number of rotations Nr of the ring gear changes based on the speed of the vehicle. Therefore, as shown in the collinear diagram of FIG. 1B, by adjusting and controlling the number of rotations of sun gear 12a (number of rotations of start/power generation motor 14), it is possible to change or control the number of rotations of carrier 12d, that is, the number of rotations of the engine 11, with a high degree of accuracy. When the two gears of planetary gear mechanism 12 are fixed, Nr=Ns=Nc, and they are driven at a gear ratio of 1. Therefore, when ring gear 12b and carrier 12d are attached by lock-up clutch 28, three rotating elements 12a, 12b and 12d, which constitute planetary gear mechanism 12, are integrally rotated.

The start/power generation motor 14 is connected to engine 11 through the planetary gear mechanism 12. The start/power generation motor 14 cranks engine 11 when the engine is started. Furthermore, after the engine is started, start/power generation motor 14 generates electric power by using one part of the power of engine 11 that is distributed by the planetary gear mechanism 12. The start/power generation motor 14 is also an alternator such as, for example, a three-phase synchronized motor and three-phase induction motor.

When the vehicle is running at a low speed, it is powered by the running/regenerative braking motor 13. When the pressure on the accelerator pedal is increased by the driver and the driving force demand is increased, the engine 11 is started by start/power generation motor 14 and the vehicle is powered by the engine 11 and running/regenerative braking motor 13. Then, by using a portion of the engine output, start/power generation motor 14 generates electric power. The driving force of engine 11 and running/regenerative braking motor 13 is transmitted to driving wheels 17 through reduction gear 15 and differential arrangement 16.

The first inverter 21 electrically connects running/regenerative braking motor 13 to battery 23. When the vehicle is running, first inverter 21 converts the direct current that is produced by battery 23 into an alternating current and supplies this alternating current to running/regenerative braking motor 13. Furthermore, during breaking, first inverter 21 converts the alternate alternating current of running/regenerative braking motor 13 into a direct current, which is then used to charge battery 23. Here, when a direct current electric motor is used as running/regenerative braking motor 13, a DC/DC converter may be used as substitute for the inverter. Examples of suitable batteries 23 include various types of rechargeable batteries such as nickel hydride, lithium ion and lead acid, as well as a power capacitor such as an electric double layer capacitor.

The second inverter 22 connects start/power generation motor 14 to battery 23. When the vehicle is started, second inverter 22 converts the direct current produced by battery 23 into an alternating current and supplies this alternating current to start/power generation motor 14. Furthermore, when the vehicle is running, second inverter 22 converts the alternating current generated by start/power generation motor 14 into a direct current which is then used to charge battery 23. Again, if a direct current electric motor is used as start/power generation motor 14, a DC/DC converter may be used as substitute for the inverter.

The hybrid controller 31 calculates the target driving force based on acceleration demand, which depends, for example, on the amount of pressure on the acceleration pedal. The acceleration demand is detected by an accelerator position sensor 41. Hybrid controller 31 controls running/regenerative braking motor 13 and start/power generation motor 14 through first inverter 21 and second inverter 22. Furthermore, hybrid controller 31 is connected to engine controller 32 by a CAN communication line and controls engine 11 through engine controller 32. Moreover, hybrid controller 31 is connected to the battery 23 by a control line. Also, hybrid controller 31 includes a SOC detecting means, which detects the state of charge (SOC) of battery 23. When the SOC is low, hybrid controller 31 initiates start/power generation motor 14 to start engine 11 and charges battery 23 with electric power, which is generated by the driving force of engine 11 at start/power generation motor 14.

The engine controller 32 receives a signal from hybrid controller 31 and controls the injection time and injected amount of fuel which is supplied to engine 11, as well as the amount that a throttle valve 11a is opened. The throttle valve 11a, which is positioned within the induction system of the engine 11, may be opened or closed as necessary by the hybrid controller 31 to control the air flow rate and pressure within the induction system, as well as the flow of an air/fuel mixture into the engine 11.

When transitioning from running with the motor alone to running with the engine, if it takes time to start the engine, the driving force may not be smoothly controlled, which adversely affects driving performance. Therefore, it is preferable to shorten the time for starting the engine. However, when the engine is started, a shock may be generated, which the driver easily detects as a jolt or a jerking movement of the vehicle powertrain, particularly when the vehicle is accelerated slowly.

When acceleration demand is small, i.e., when the pressure on the accelerator pedal exerted by the driver is small, the shock caused by the engine start may be decreased by injecting fuel when a pressure drop is detected inside the induction system. In addition, the throttle valve 11a may optionally be closed. Alternatively, the cranking time may be extended instead of, or in addition to, injecting fuel. By doing so, it may be possible to decrease the shock at the time the engine starts and smooth the acceleration.

As used herein the term pressure drop refers to a drop in the pressure over a given time interval of the gas flowing in the induction system of the engine of the vehicle.

On the other hand, when acceleration demand is great, i.e. the pressure on the accelerator pedal exerted by the driver is large, if the same procedure is applied, the acceleration response may deteriorate. Under these conditions the throttle valve 11a is opened and the fuel is injected prior to the detection of a pressure drop inside the induction system by starting the fuel injection earlier. This procedure may prevent deterioration of the acceleration response.

The control logic of engine controller 32 will be more practically described below by referring to the flowchart of FIG. 2.

Figure 2:
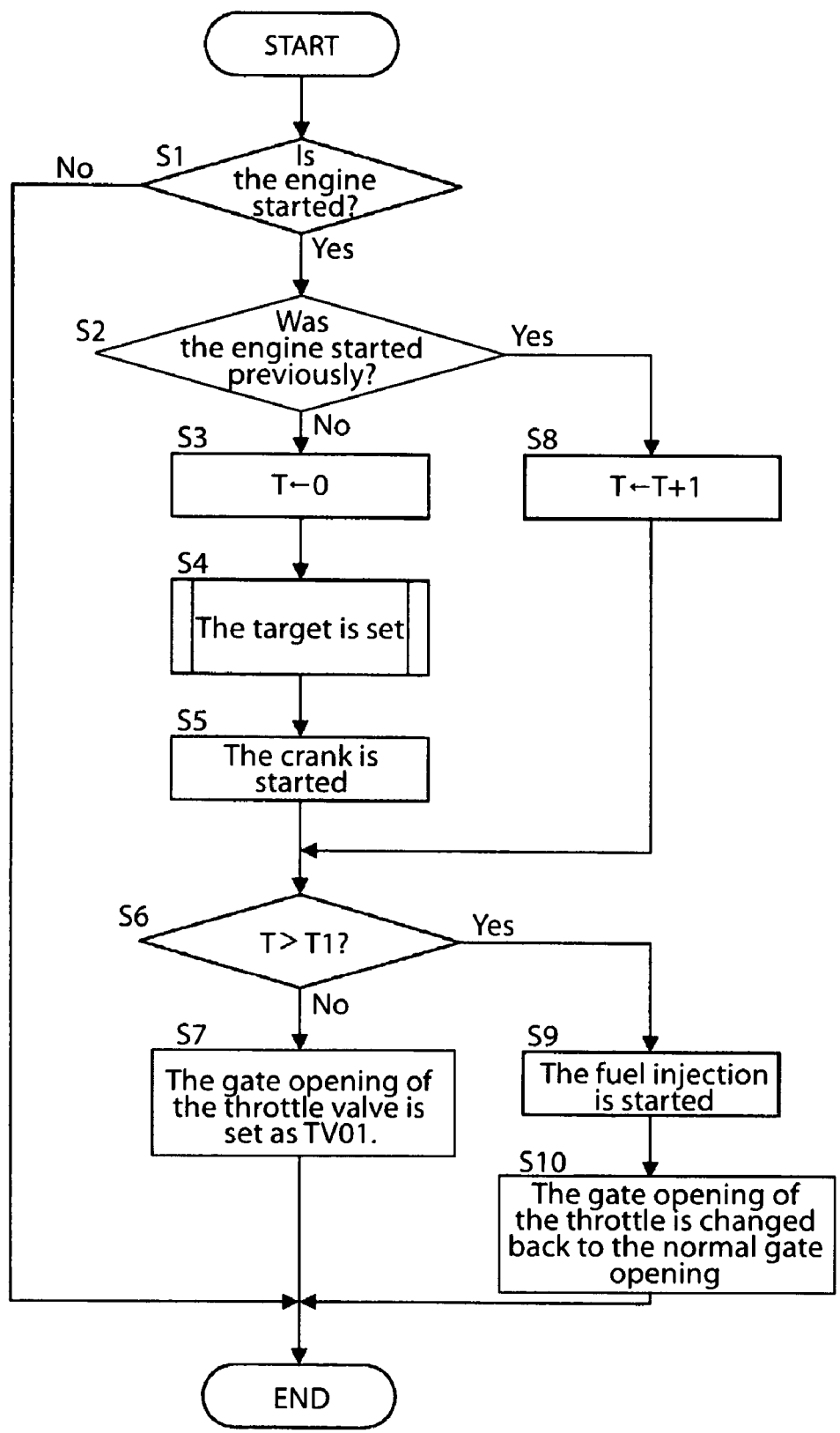
FIG. 2 is a main flowchart indicating the operation of the engine start control device for a hybrid vehicle.

FIG. 2 is a flowchart describing exemplary operation of the engine start device for a hybrid vehicle. In step S1, after receiving the engine start signal from hybrid controller 31, engine controller 32 moves on to step S2 and subsequent steps.

In step S2, engine controller 32 determines whether or not the vehicle was previously started by the engine 11 (that is, whether or not this is the first time the vehicle has been started by the engine 11). If the vehicle was not previously started by the engine 11, engine controller 32 proceeds to step S3. If the vehicle was previously started by the engine 11, engine controller 32 proceeds to step S8.

In step S3, engine controller 32 re-sets timer T. In step S4, engine controller 32 sets the target. The content of the target setting routine will be more practically described later. In step S5, engine controller 32 starts cranking by start/power generation motor 14 through hybrid controller 31.

In step S6, engine controller 32 determines whether or not timer T exceeds target time T1 which is set by target setting routine S4. Before timer T exceeds target time T1, engine controller 32 moves on to step S7 and after timer T exceeds target time T1, engine controller 32 moves on to step S9.

In step S7, engine controller 32 sets the gate opening of throttle valve 11a to a position referred to herein as gate opening TV01, which is set by target setting routine S4. In step S8, engine controller 32 increments timer T. In step S9, engine controller 32 starts fuel injection. In step S10, engine controller 32 resets the gate opening of throttle valve 11a from TV01 to its normal position.

Figure 3:
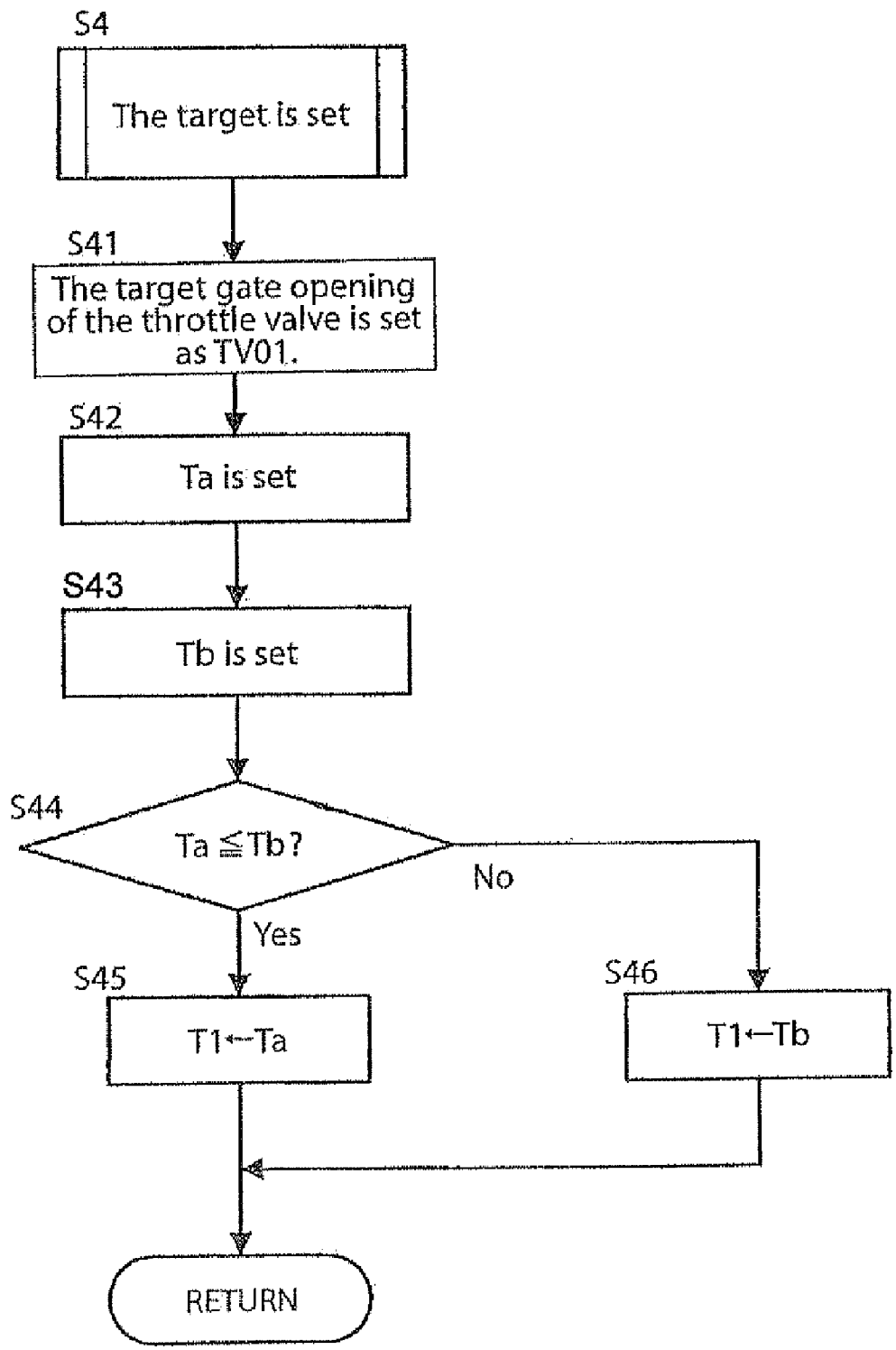
FIG. 3 is a flowchart of the target setting routine.

FIG. 3 is a flow chart illustrating an exemplary target setting routine. The target setting routine of FIG. 3 is described with reference to FIG. 46. In step S41, engine controller 32 sets target gate opening TV01 of throttle valve 11a, which will be explained in more detail below based on the graph shown in FIG. 4.

Figure 4:
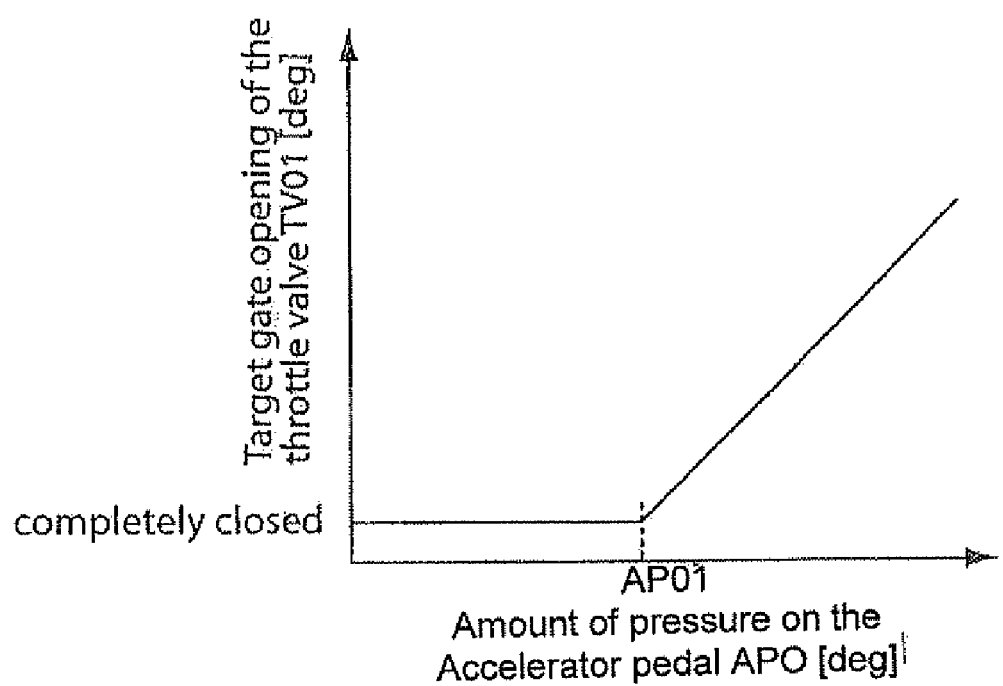
FIG. 4 is a graph indicating target gate opening TV$01$ of the throttle valve versus the amount of pressure on the accelerator pedal.

FIG. 4 indicates target gate opening TV01 of the throttle valve versus acceleration demand—the amount of pressure on the accelerator pedal and/or the output of the acceleration sensor and the like. When the amount of pressure on the accelerator pedal APO is the predetermined value AP01 or lower, the target gate opening TV01 of the throttle valve 11a is completely opened. In this manner, when the pressure on the accelerator pedal from the driver is small and the acceleration demand is small, the throttle valve 11a is completely opened. When acceleration demand is great, i.e., the pressure on the accelerator pedal from the driver is large, and the amount of pressure on the accelerator pedal exceeds the predetermined value AP01, target gate opening TV01 of the throttle valve 11a is set. The values in FIG. 4 are determined experimentally beforehand.

Figure 5:
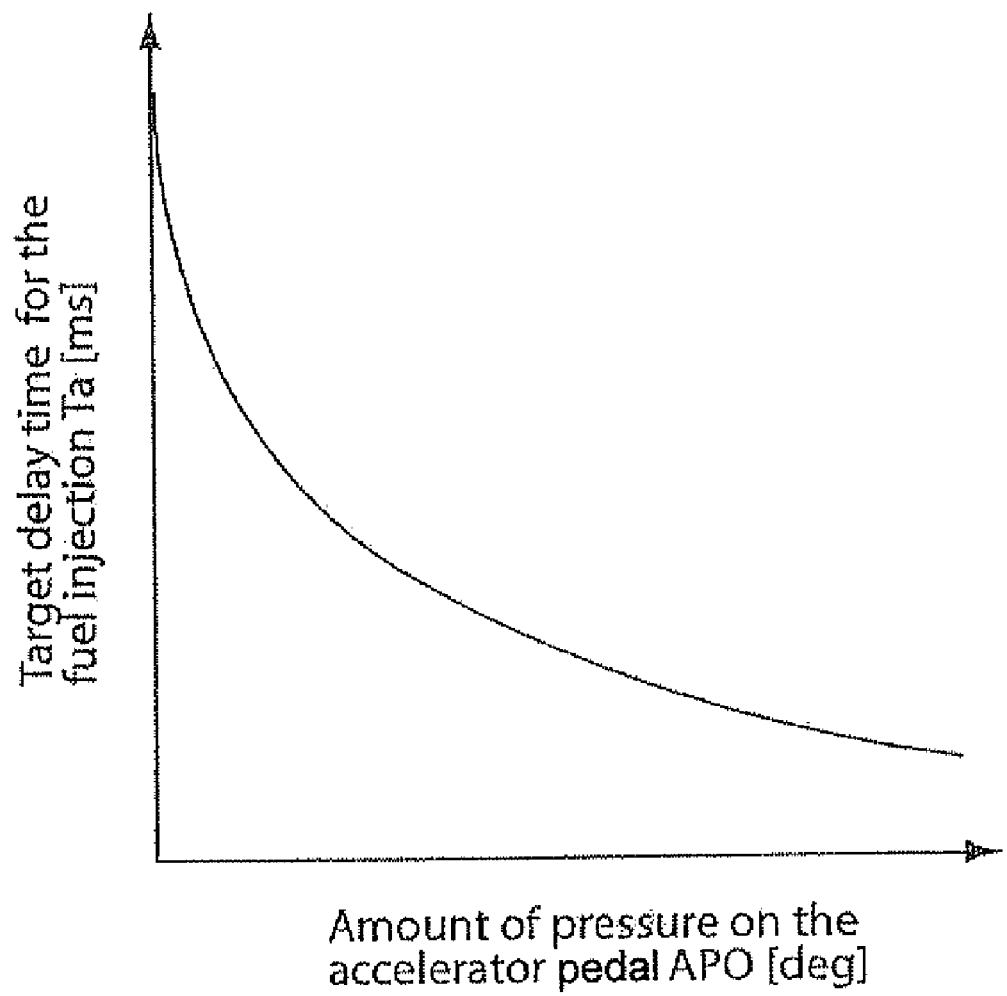
FIG. 5 is a graph indicating target delay time Ta for the fuel injection versus the amount of pressure on the accelerator pedal.

In step S42, engine controller 32 sets target delay time Ta for the fuel injection based on the amount of pressure on the accelerator pedal. More practically, target delay time Ta is determined based on the graph shown in FIG. 5. FIG. 5 indicates target delay time Ta for the fuel injection versus the amount of pressure on the accelerator pedal, which is determined experimentally beforehand. As may be seen from FIG. 5, as the pressure on the accelerator pedal exerted by the driver increases, target delay time Ta decreases and as the pressure on the accelerator pedal exerted by the driver decreases, target delay time Ta increases. Especially when the amount of pressure on the accelerator pedal exerted by the driver is small, the required driving force may be small. In this case, for example, it is assumed that it is necessary to start engine 11 since the SOC of battery 23 is small. Therefore, target delay time Ta is extended to alleviate shock at the time of the engine start.

Figure 6:
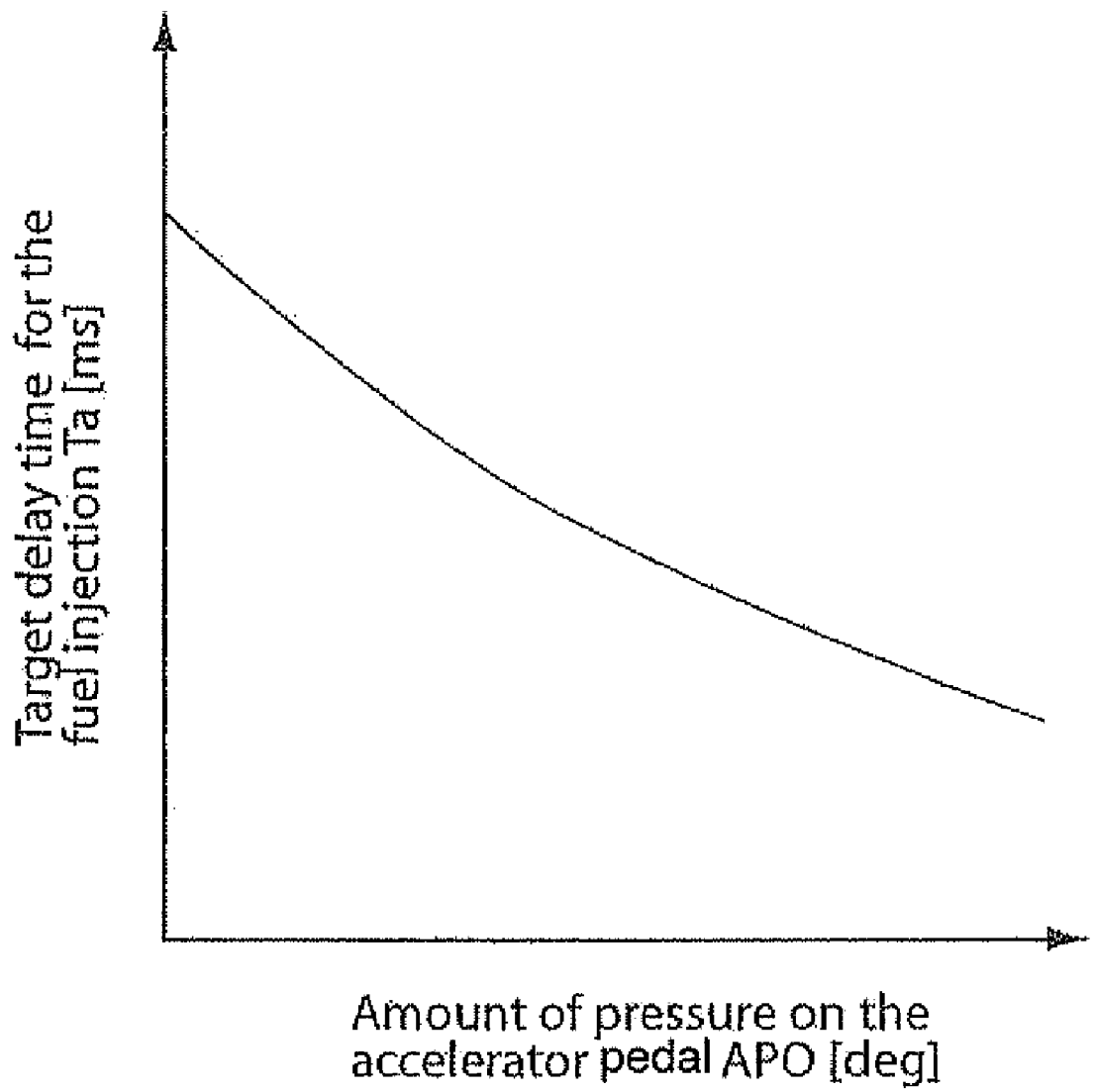
FIG. 6 is a graph indicating target delay time Tb for the fuel injection versus the rate of the pressure on the accelerator pedal.

In step S43, engine controller 32 may set target delay time Tb for the fuel injection based on the rate of the pressure on the accelerator pedal. More practically, target delay time Tb may be determined based on the graph shown in FIG. 6. FIG. 6 indicates target delay time Tb for the fuel injection versus the rate of the pressure on the accelerator pedal, which is determined experimentally beforehand. As may be seen from FIG. 6, as the rate of the pressure on the accelerator pedal exerted by the driver increases, target delay time Tb decreases and as the rate of the pressure on the accelerator pedal exerted by the driver decreases, target delay time Tb increases.

In step S44, engine controller 32 compares the size of target delay times Ta and Tb. When Ta≦Tb, engine controller 32 moves on to step S45 and sets Ta as target delay time T1. When Ta>Tb, engine controller 32 moves on to step S46 and sets Tb as target delay time T1.

Figure 7:
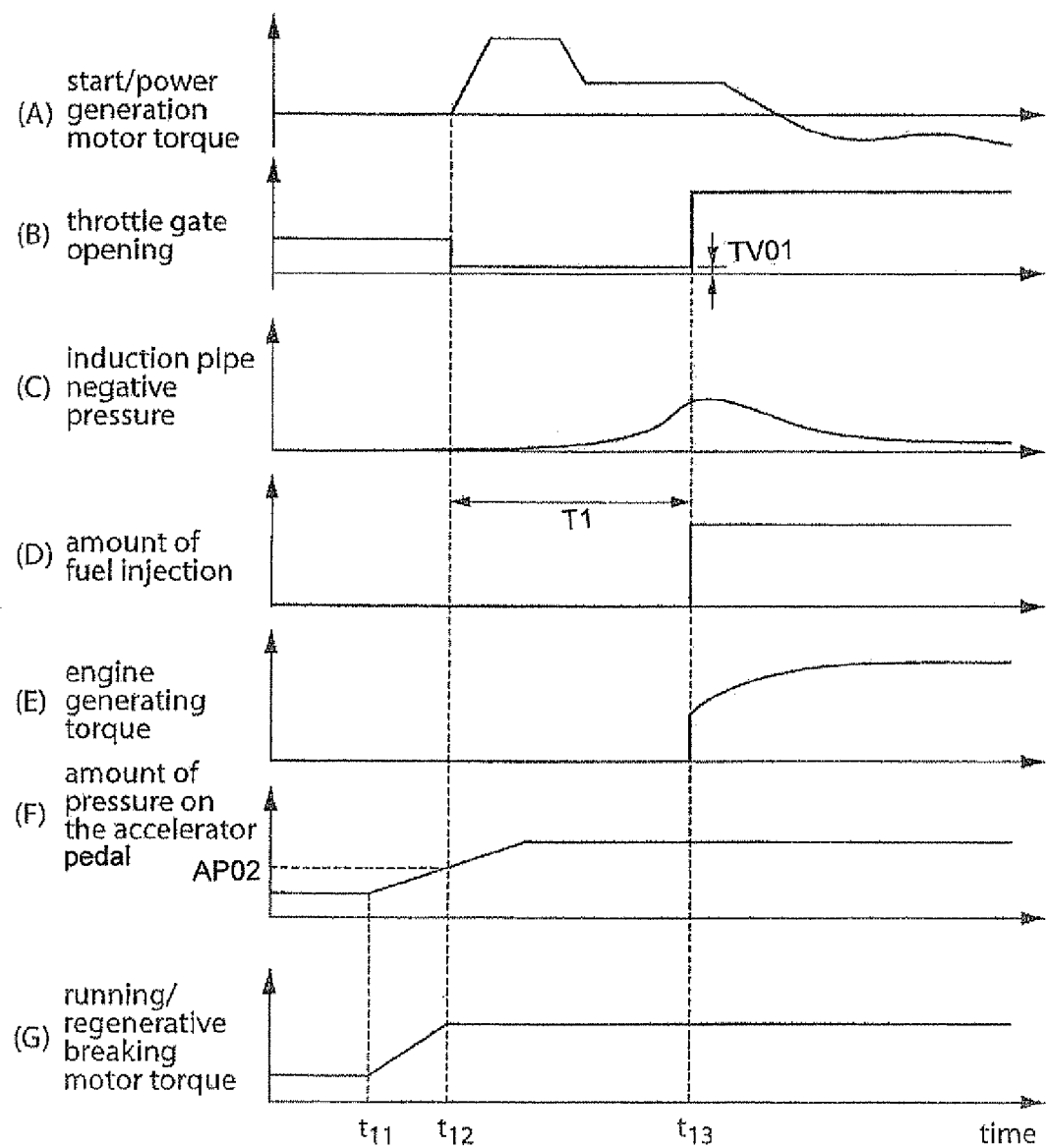
FIG. 7 is a time chart of the case where the amount of pressure on the accelerator pedal is small (AP$0$≦AP$01$).

FIG. 7 is a time chart illustrating the case where the amount of pressure exerted by the driver on the accelerator pedal is small (APO≦AP01). Until time t11, the amount of pressure on the accelerator pedal from the driver is small (FIG. 7(F))

and the vehicle runs only by running/regenerative braking motor 13 (FIGS. 7(E) and (G)).

At time t 11 when the amount of pressure on the accelerator pedal exerted by the driver increases (FIG. 7(F)), the torque of running/regenerative braking motor 13 increases (FIG. 7(G)).

At time t 12 when the amount of pressure on the accelerator pedal exceeds standard value AP02 (FIG. 7(F)), the control shown in the flowchart of FIG. 2 is started (step S1→S2 of FIG. 2).

After timer T is re-set (step S3 of FIG. 2), the target value is set (step S4 of FIG. 2). Here, the amount of pressure on the accelerator pedal APO is predetermined value AP01 or less and target gate opening TV01 of the throttle valve 11a is completely closed. Also, target delay time T1 is the smaller of target delay time Ta for the fuel injection, which is set based on the amount of pressure on the accelerator pedal, or target delay time Tb for the fuel injection, which is set based on the rate of the pressure on the accelerator pedal.

Next, cranking of engine 11 is started by start/power generation motor 14 (FIG. 7(A) and step S5 of FIG. 2) and the gate opening of the throttle valve 11a becomes TV01 (FIG. 7(B) and step S7 of FIG. 2).

Then, at time t 13 when timer T goes beyond target delay time T1 (Yes in step S6 of FIG. 2), the fuel injection is started (FIG. 7(D) and step S9 of FIG. 2) and at the same time the gate opening of throttle valve 11a is changed back from TV01 to the normal gate opening (FIG. 7(B) and step S10 of FIG. 2). By doing so, engine 11 generates torque (FIG. 7(E)). In this way, throttle valve 11a is completely closed and a pressure drop develops inside the induction system of the engine 11 (FIG. 7(C)). Therefore, it is possible to reduce the shock at the time of the engine start.

Figure 8:
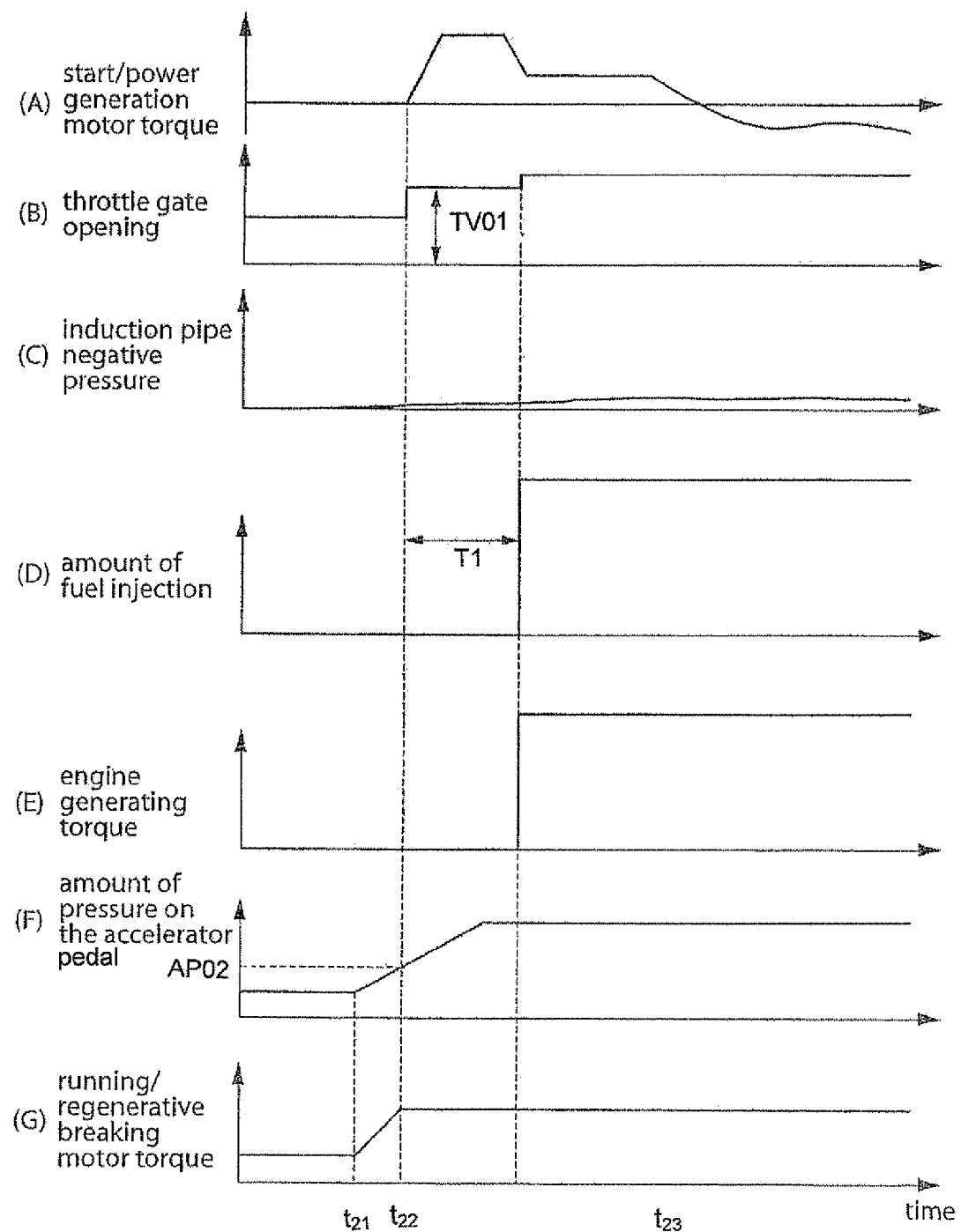
FIG. 8 is a time chart of the case where the amount of pressure on the accelerator pedal is large (AP$0$≦AP$01$).

FIG. 8 is a time chart indicating the case where the amount of pressure on the accelerator pedal is large (APO>AP01). Until time t 21, the amount of pressure on the accelerator pedal exerted by the driver is small (FIG. 8(F)), and the vehicle runs only by running/regenerative braking motor 13 (FIGS. 8(E) and (G)).

At time t 21 when the amount of pressure on the accelerator pedal exerted by the driver is increased (FIG. 8(F)), the torque of running/regenerative braking motor 13 is increased (FIG. 8(G)). At time t 22 when the amount of pressure on the accelerator pedal exceeds standard value AP02 (FIG. 8(F)), the control logic shown in the flowchart of FIG. 2 is started (step S1→S2 of FIG. 2).

After timer T is re-set (step S3 of FIG. 2), the target value is set (step S4 of FIG. 2). Here, amount of pressure on the accelerator pedal APO is larger than predetermined value AP01 and target gate opening TV01 is determined based on FIG. 2. Also, target delay time T1 is the smaller of target delay time Ta for the fuel injection, which is set based on the amount of pressure on the accelerator pedal, or target delay time Tb for the fuel injection, which is set based on the rate of the pressure on the accelerator pedal.

Next, cranking of engine 11 is started by start/power generation motor 14 (FIG. 8(A) and step S5 of FIG. 2) and the gate opening of the throttle valve 11a is set at TV01 (FIG. 8(B) and step S7 of FIG. 2).

Then, at time t 23 when timer T goes beyond target delay time T1 (Yes in step S6 of FIG. 2), the fuel injection is started (FIG. 8(D) and step S9 of FIG. 2) and at the same time the gate opening of throttle valve 11a is changed to the normal gate opening (FIG. 8(B) and step S110 of FIG. 2). By doing so, engine 11 generates torque (FIG. 8(E)). In this way, throttle valve 11a has a gate opening of TV01 and the pressure drop is not developed inside the induction system (FIG. 8(C)). Therefore, engine 11 generates significant torque and it is possible to sufficiently increase speed.

The engine start control device for a hybrid vehicle that is described above prevents the shock that the driver feels when acceleration demand is small and the vehicle is accelerated slowly. In addition, the engine start control device makes it possible to accelerate the vehicle with a good throttle response when acceleration demand is great and the vehicle is rapidly accelerated.

The present invention is not limited to the above described embodiment and can be changed to a variety of forms within the scope of its technological idea. Various embodiments of the invention have been described. These and other embodiments are within the scope of the following claims.

The invention claimed is:

1. An engine start control device for a hybrid vehicle equipped with an electric motor and an engine with an induction system, comprising:
   a hybrid controller that performs an engine start determination to determine whether the engine should be started while the electric motor is running;
   an acceleration position sensor that detects an acceleration demand of the driver during the engine start determination; and
   a start/power generation motor that starts the engine, wherein a pressure in the induction system is controlled based on the acceleration demand, the hybrid controller determines whether the engine should be started based on the acceleration demand, the start/power generation motor cranks the engine based on the hybrid controller determination and the hybrid controller starts the engine by starting a fuel injection a predetermined time after the cranking starts.

2. The engine start control device for a hybrid vehicle as set forth in claim 1, wherein the acceleration position sensor detects the acceleration demand of the driver based on an amount of pressure on an accelerator pedal.

3. The engine start control device for a hybrid vehicle as set forth in claim 1, wherein the hybrid controller determines whether the engine should be started based on a state of battery charge.

4. The engine start control device for a hybrid vehicle as set forth in claim 1, wherein the start/power generation motor cranks the engine with a throttle valve opening based on the acceleration demand.

5. The engine start control device for a hybrid vehicle as set forth in claim 1, wherein the hybrid controller controls the pressure of the induction system so that as the acceleration demand decreases, a drop in the pressure of the induction system increases.

6. The engine start control device for a hybrid vehicle as set forth in claim 4, wherein the hybrid controller closes the throttle valve opening when the acceleration demand falls below a predetermined demand.

7. The engine start control device for a hybrid vehicle as set forth in claim 4, wherein the the hybrid controller increases the throttle valve opening as an amount of the acceleration demand increases when the acceleration demand is greater than a predetermined demand.

8. The engine start control device for a hybrid vehicle as set forth in claim 4, wherein the hybrid controller extends the time from the start of the cranking to the start of the fuel injection as the acceleration demand decreases.

9. The engine start control device for a hybrid vehicle as set forth in claim 4, wherein a time from a start of the cranking to a start of the fuel injection is a lesser of a first delay time calculated based on an amount of pressure on the accelerator pedal and a second delay time calculated based on a rate of the pressure on the accelerator pedal.

10. A method of controlling an engine start for a hybrid vehicle equipped with an electric motor and an engine comprising:
- determining whether the engine should be started while the motor is running, wherein the engine comprises an induction system;
- detecting an acceleration demand of a driver during an engine start determination;
- determining whether the engine should be started based on the acceleration demand of the driver;
- controlling a pressure in the induction system by cranking the engine based on the determination of whether the engine should be started; and
- starting the engine after controlling the pressure by starting a fuel injection a predetermined time after the cranking starts.

11. The method of claim 10, wherein detecting the acceleration demand of the driver comprises detecting the acceleration demand based on an amount of pressure on an accelerator pedal.

12. The method of claim 10, further comprising:
- detecting a state of battery charge; and
- determining whether the engine should be started based on the state of battery charge.

13. The method of claim 10, further comprising:
- cranking the engine with a throttle gate opening based on the acceleration demand.

14. The method of claim 10, wherein controlling the pressure further comprises controlling an induction system pressure drop so that as the acceleration demand decreases, the induction system pressure drop increases.

15. The method of claim 13, further comprising closing the throttle gate opening when the acceleration demand falls below a predetermined demand.

16. The method of claim 13, further comprising making the throttle gate opening wider as the acceleration demand increases when the acceleration demand is greater than a predetermined demand.

17. The method of claim 13, further comprising extending a time from a start of the cranking to a start of the fuel injection as the acceleration demand decreases.

18. The method of claim 13, wherein a time from a start of the cranking to a start of the fuel injection is a lesser of a first delay time calculated based on an amount of pressure on the accelerator pedal and a second delay time calculated based on a rate of the pressure on the accelerator pedal.

19. An engine start control device for a hybrid vehicle equipped with an electric motor and an engine, comprising:
- means for performing an engine start determination while the electric motor is running;
- means for detecting an acceleration demand of a driver during the engine start determination;
- means for controlling an induction pressure of an induction system while cranking the engine, the induction pressure based on the acceleration demand; and
- means for starting the engine by starting a fuel injection a predetermined time after a start of cranking of the engine wherein a time from the start of the cranking to a start of the fuel injection is a lesser of a first delay time calculated based on an amount of pressure on the accelerator pedal and a second delay time calculated based on a rate of the pressure on the accelerator pedal.

* * * * *